(12) United States Patent
Yu et al.

(10) Patent No.: US 12,547,223 B2
(45) Date of Patent: Feb. 10, 2026

(54) BAFFLE STRUCTURE

(71) Applicant: ASUSTek COMPUTER INC., Taipei (TW)

(72) Inventors: Wen-Ting Yu, Taipei (TW); Kunsu Zhang, Taipei (TW); Zhaowei Sheng, Taipei (TW); Feng Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 148 days.

(21) Appl. No.: 18/596,627

(22) Filed: Mar. 6, 2024

(65) Prior Publication Data

US 2025/0155942 A1 May 15, 2025

(30) Foreign Application Priority Data

Nov. 15, 2023 (TW) .................................. 112144052

(51) Int. Cl.
*H01R 13/46* (2006.01)
*G06F 1/18* (2006.01)

(52) U.S. Cl.
CPC ............... *G06F 1/18* (2013.01); *H01R 13/46* (2013.01)

(58) Field of Classification Search
None
See application file for complete search history.

(56) References Cited

U.S. PATENT DOCUMENTS

| 7,380,995 | B2* | 6/2008 | Chan | G02B 6/4292 |
| | | | | 361/728 |
| 7,733,659 | B2* | 6/2010 | Snider | H05K 5/0226 |
| | | | | 361/752 |
| 9,079,546 | B2* | 7/2015 | Shoji | H04B 1/082 |
| 10,881,030 | B1* | 12/2020 | Lunsman | H05K 7/1487 |
| 11,490,539 | B2* | 11/2022 | Zhang | H05K 7/1487 |
| 11,537,181 | B1* | 12/2022 | Wang | G06F 1/186 |
| 12,104,630 | B2* | 10/2024 | Fujii | F16B 2/06 |
| 2002/0118514 | A1* | 8/2002 | Coglitore | G06F 1/18 |
| | | | | 361/724 |
| 2007/0067119 | A1* | 3/2007 | Loewen | G01R 22/065 |
| | | | | 702/57 |

(Continued)

FOREIGN PATENT DOCUMENTS

CN 208782181 4/2019
CN 212112296 12/2020

*Primary Examiner* — Krystal Robinson
(74) *Attorney, Agent, or Firm* — JCIPRNET

(57) ABSTRACT

A baffle structure applied to be installed on a motherboard having multiple connection ports. The baffle structure includes a front plate having multiple through holes for accommodating the connection ports, two side plates, a top plate and a positioning component. The front plate has a first side adjacent to the motherboard, and a second side opposite to the first side. The two side plates are placed on two sides of the front plate, and a hollow column is provided at an end of each side plate away from the front plate. The top plate is placed on the second side and two sides are respectively connected to the side plates. The top plate has two openings corresponding to the two hollow columns respectively. The positioning component has two fixing parts. The fixing parts pass through the top plate and the two hollow columns respectively to be combined with the motherboard.

10 Claims, 8 Drawing Sheets

(56) References Cited

U.S. PATENT DOCUMENTS

| | | | |
|---|---|---|---|
| 2015/0104246 A1* | 4/2015 | Chiang | F16B 21/086 |
| | | | 403/330 |
| 2017/0332504 A1* | 11/2017 | Huang | G06F 1/185 |
| 2019/0045659 A1* | 2/2019 | Donachy | H05K 7/20727 |
| 2020/0211523 A1* | 7/2020 | Doglio | G10K 11/161 |
| 2020/0229311 A1* | 7/2020 | Wu | H05K 7/1487 |
| 2022/0114130 A1* | 4/2022 | Lin | G06F 13/4221 |
| 2022/0117111 A1* | 4/2022 | Tseng | G06F 1/186 |
| 2023/0324963 A1* | 10/2023 | Wu | G06F 1/185 |

* cited by examiner

BAFFLE STRUCTURE

CROSS-REFERENCE TO RELATED APPLICATION

This application claims the priority benefit of Taiwan application serial no. 112144052, filed on Nov. 15, 2023. The entirety of the above-mentioned patent application is hereby incorporated by reference herein and made a part of this specification.

BACKGROUND

Technical Field

The disclosure relates to a baffle structure, and particularly relates to a baffle structure that is easy to install.

Description of Related Art

The conventional baffle structures adapted in computer cases and motherboards have dimensional tolerance as manufacturers differ. Therefore, the baffle structure is not easy to install when aligned with connection ports of the motherboard. Specifically, the conventional baffle structure and the motherboard are independent components, and the user installs the baffle structure to the position of the through holes of the corresponding connection ports of the computer case by him/herself. However, such baffle structure may be bent easily and is difficult to align with.

SUMMARY

The disclosure provides a baffle structure applied to be installed on a motherboard. The motherboard has multiple connection ports. The baffle structure includes a front plate, two side plates, a top plate and a positioning component. The front plate has multiple through holes, a first side and a second side that are opposite to each other, and the through holes are adapted to accommodate multiple connection ports. The first side is adjacent to the motherboard. The two side plates are respectively disposed on two sides of the front plate respectively. A hollow column is provided at the end of each of the side plates away from the front plate. The top plate is disposed on the second side. Two sides are connected to the two side plates respectively. The top plate has two openings. that the two openings correspond to the two hollow columns respectively. The positioning component includes two fixing parts. The two fixing parts pass through the top plate and the two hollow columns to be with the motherboard.

In view of the above, in the baffle structure according to the disclosure, the two side plates are directly fastened to the motherboard and accommodate multiple connection ports. During installation, the two side plates are aligned with a position where the motherboard is installed, and then the through holes of the front plate are aligned with the connection ports. Afterwards, the positioning component is disposed on the top plate and the two side plates to fix an end of the side plate to the motherboard.

More specifically, the baffle structure according to the disclosure is combined with the motherboard. Therefore, when compared with the conventional baffle structure that is a separate component from the motherboard, a process in which the user installs the baffle structure by him/herself is omitted, and the assembling efficiency is facilitated.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
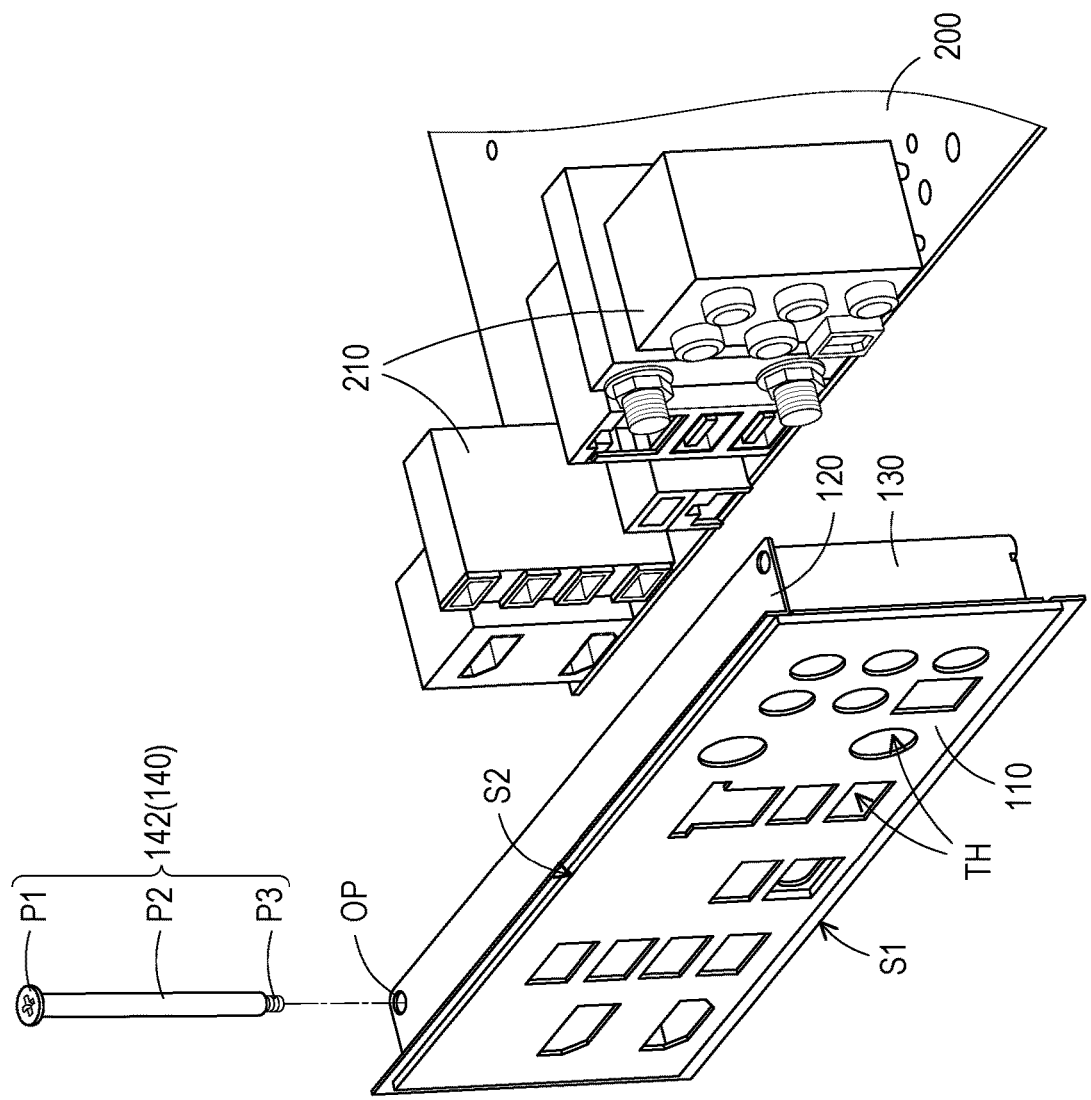
FIG. 1A is a schematic perspective view of a baffle structure and a motherboard according to an embodiment of the disclosure.
Figure 1B:
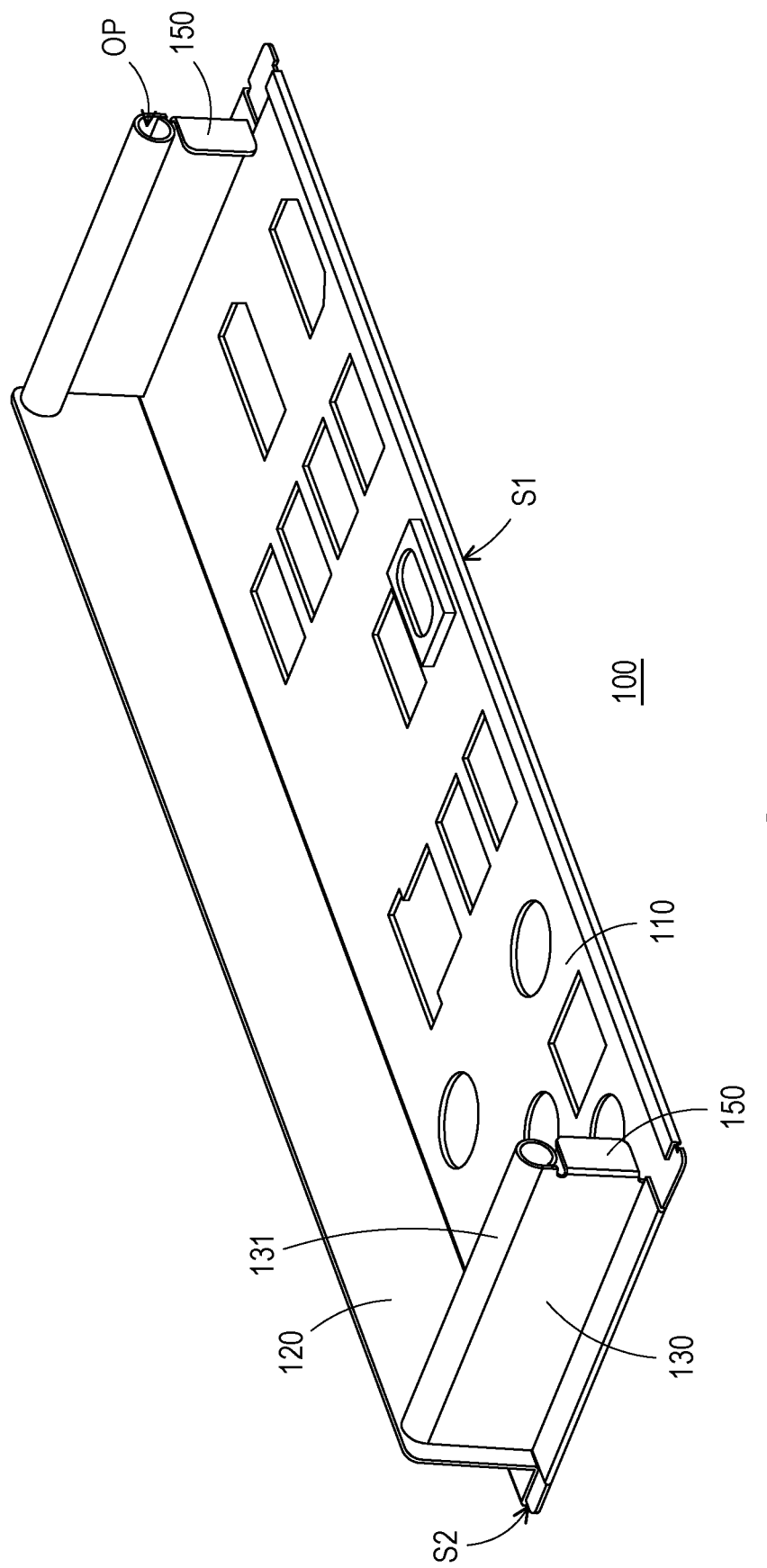
FIG. 1B is a schematic perspective view of the baffle structure in FIG. 1A in another direction.
Figure 2A:
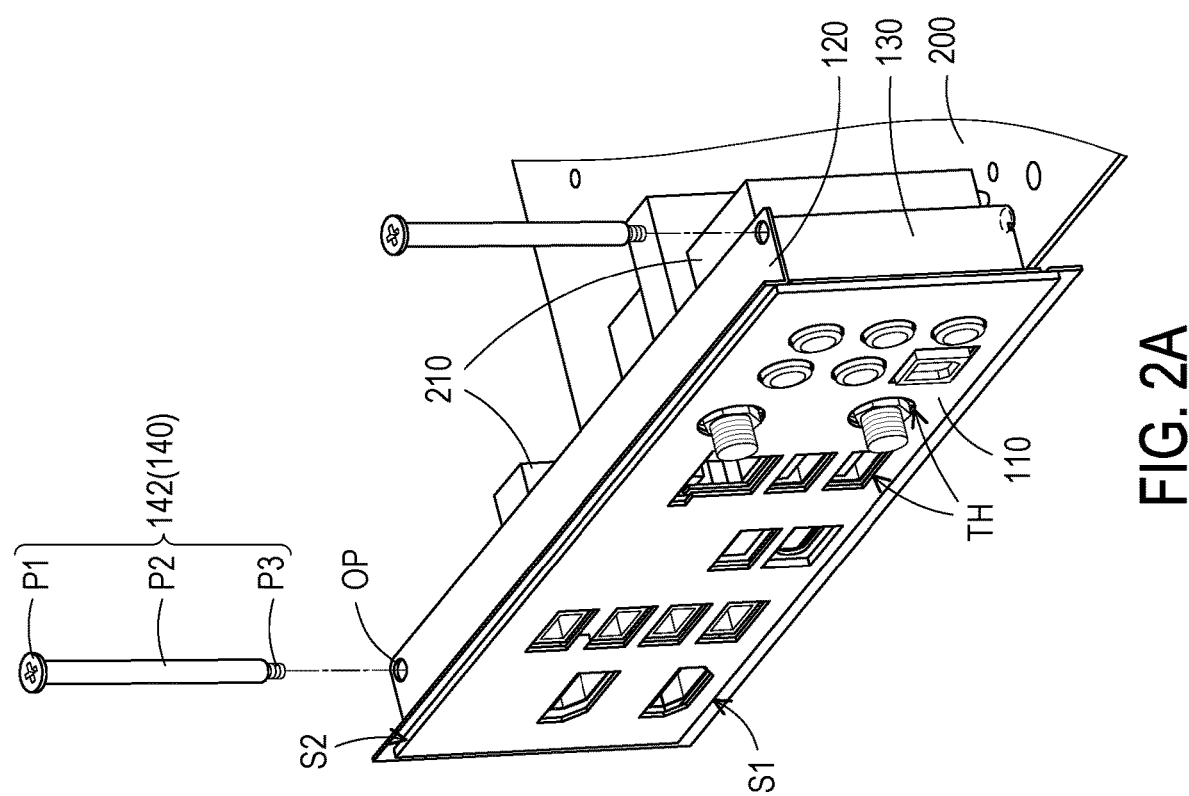
FIG. 2A is a schematic perspective view of the baffle structure in FIG. 1A combined with the motherboard.
Figure 2B:
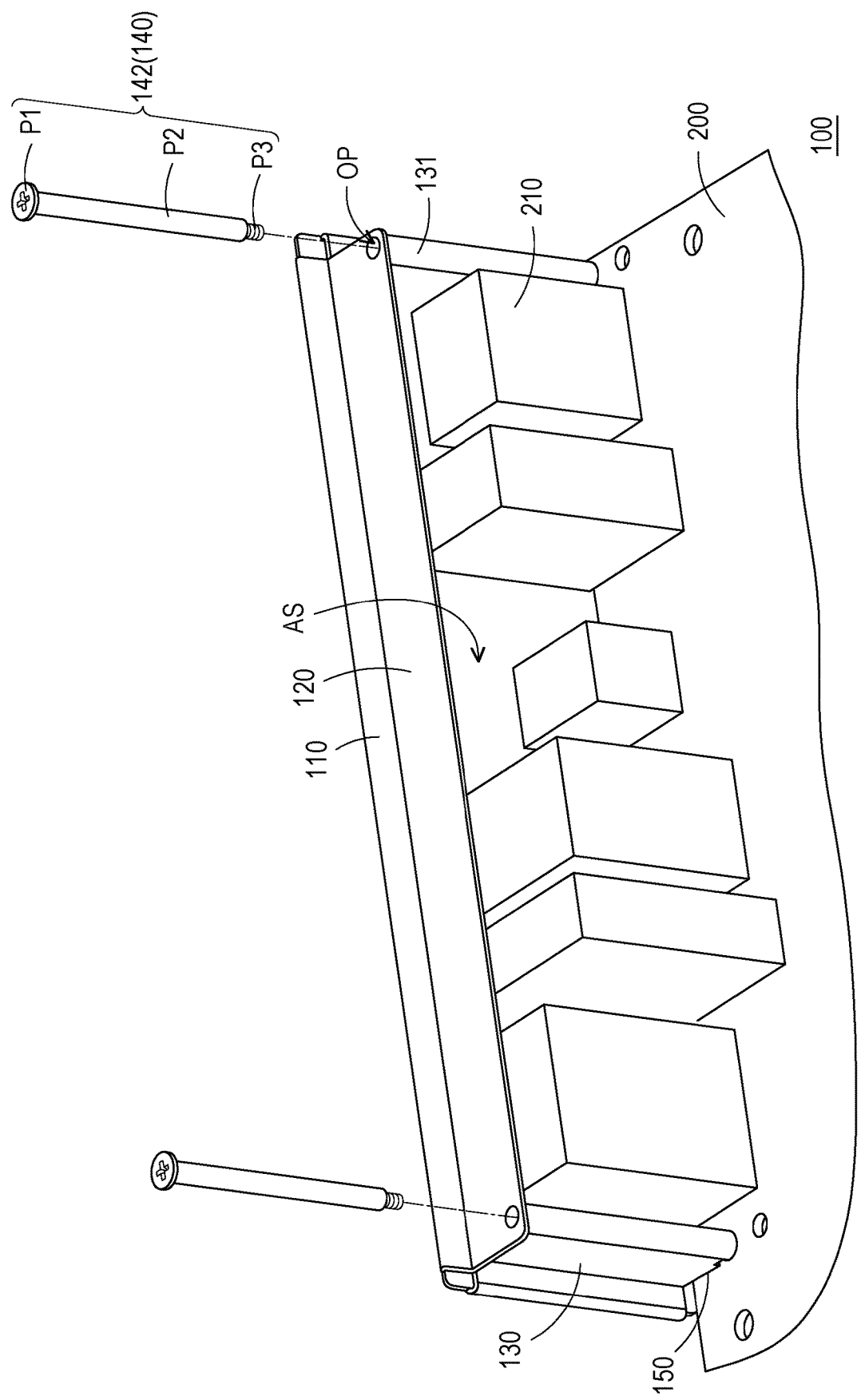
FIG. 2B is a schematic perspective view of the baffle structure combined with the motherboard in FIG. 2A from another perspective.
Figure 2C:
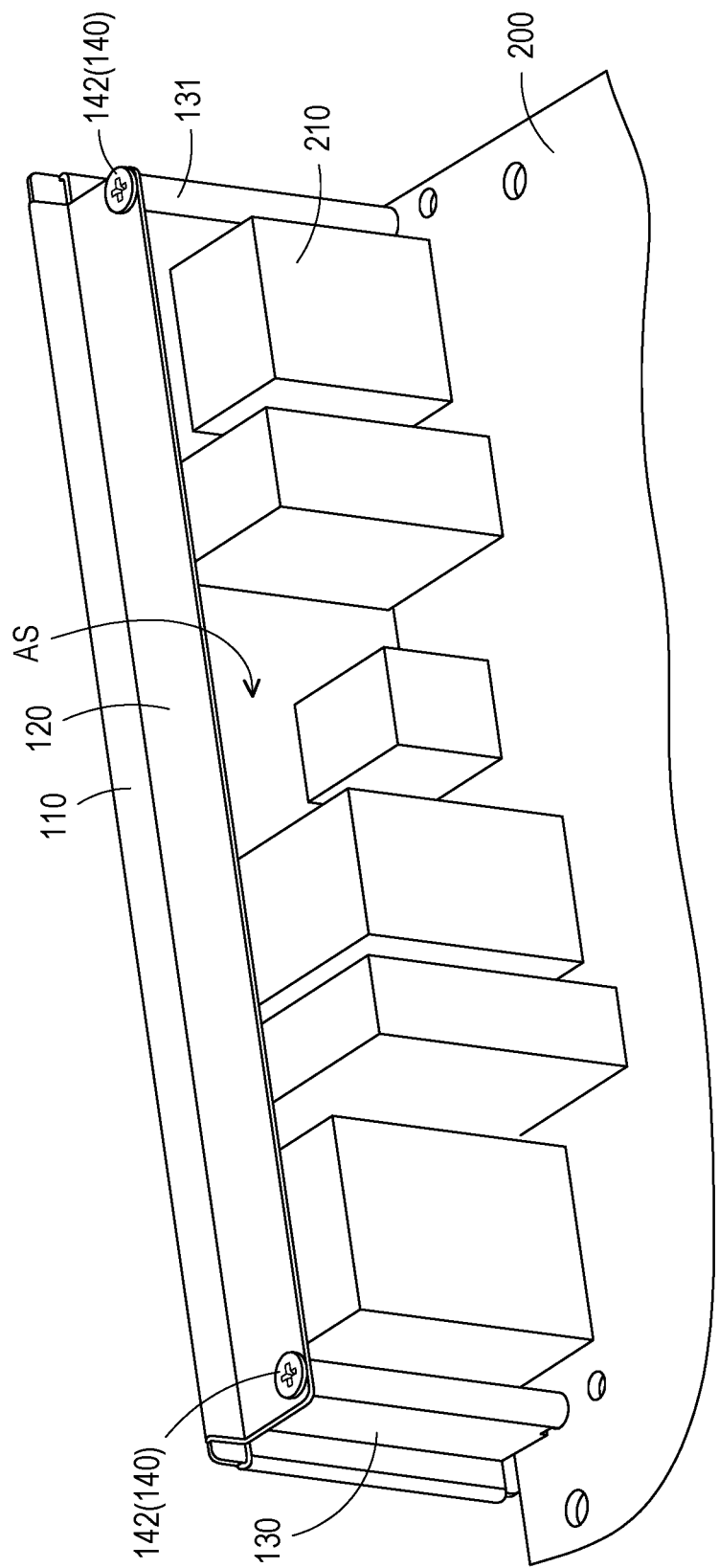
FIG. 2C is a schematic perspective view of a positioning component that passes through a top plate and a side plate in FIG. 2B.

FIG. 1A is a schematic perspective view of a baffle structure and a motherboard according to an embodiment of the disclosure. FIG. 1B is a schematic perspective view of the baffle structure in FIG. 1A in another direction. FIG. 2A is a schematic perspective view of the baffle structure in FIG. 1A combined with the motherboard. FIG. 2B is a schematic perspective view of the baffle structure combined with the motherboard in FIG. 2A from another perspective. FIG. 2C is a schematic perspective view of a positioning component that passes through a top plate and a side plate in FIG. 2B.

Referring to FIG. 1A, FIG. 1B and FIG. 2A, the disclosure provides a baffle structure 100 applied to be installed to a motherboard 200. The motherboard 200 has multiple connection ports 210. The baffle structure 100 is configured to accommodate and position the connection ports 210 and partially block the openings of a computer case to reduce the dust entering the computer case through the openings from the outside, thereby reducing the amount of dust accumulated on the motherboard 200.

Referring to FIG. 1B and FIG. 2A, the baffle structure 100 includes a front plate 110, two side plates 130, a top plate 120 and a positioning component 140. The front plate 110 has multiple through holes TH and a first side S2 and a second side S2 opposite to each other. The through holes TH are configured to accommodate terminals of the connection ports 210. The first side S1 is adjacent to the motherboard 200, and the second side S2 is away from the motherboard 200. The two side plates 130 are respectively disposed on the opposite two sides of the front plate 110, and a hollow column 131 is provided at an end of each side plate 130 away from the front plate 110. The top plate 120 is disposed on the second side S2 of the front plate 110 and spaced apart from the motherboard 200. The two sides of the top plate 120 are connected to the side plates 130 respectively, and the top plate 120 has two openings OP. The two openings OP respectively correspond to the two hollow columns 131.

The positioning component 140 includes two fixing parts 142, the two fixing parts 142 pass through the top plate 120 and the two hollow columns 131 respectively to be combined with the motherboard 200. More specifically, the positioning component 140 is disposed on the top plate 120, the two side plates 130 and the motherboard 200 (as in FIG. 2C) in order to fix the end of each side plate 130 away from the top plate 120 to the motherboard 200. Accordingly, the baffle structure 100 is combined with the motherboard 200.

Referring to FIG. 1B and FIG. 2B, more specifically, the top plate 120 and the two side plates 130 jointly define an accommodation space AS. The accommodation space AS accommodates a portion of the connection ports 210, and the top plate 120 and the two side plates 130 form a U-shape.

More specifically, referring to FIG. 1B, the hollow column 131 of each side plate 130 extends from an end of the side plate 130 close to the top plate 120 to another end of the side plate 130 away from the top plate 120. In addition, each hollow column 131 is aligned with the opening OP formed on the top plate 120. The hollow column may be formed by bending the edge of each side plate or welding the hollow column to the edge of each side plate.

Figure 3:
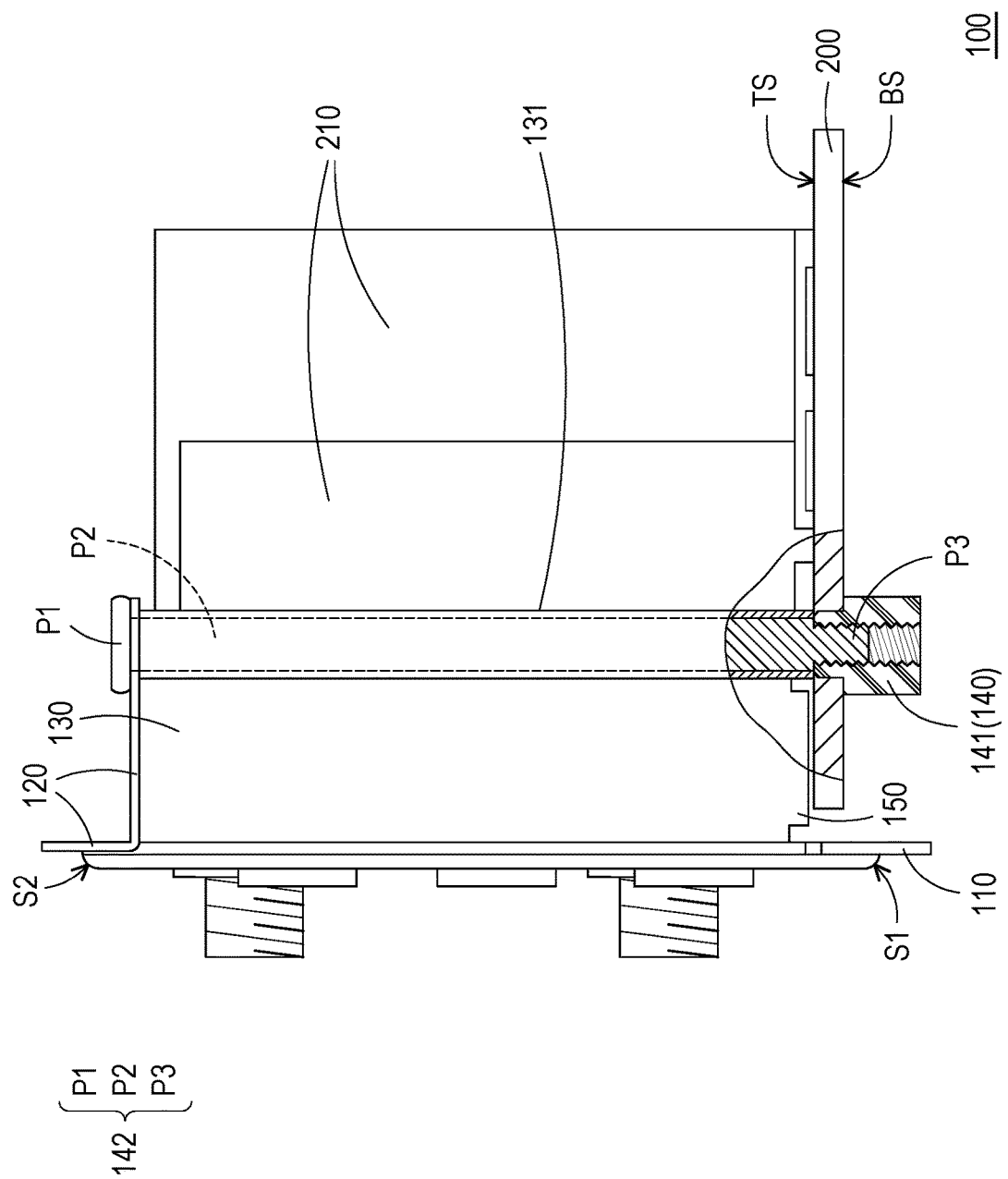
FIG. 3 is a schematic side view of the baffle structure in FIG. 2C combined with the motherboard.

FIG. 3 is a schematic side view of the baffle structure in FIG. 2C combined with the motherboard.

Referring to FIG. 2B, FIG. 2C and FIG. 3, the positioning component 140 has two screw seats 141, and the two fixing parts 142 are two screws. Each screw seat 141 is disposed on a bottom surface BS of the motherboard 200 away from the side plate 130, each screw seat 141 is aligned with the hollow column 131, and each fixing part 142 passes through the top plate 120 and the hollow column 131 in order, so as to be fixed to each screw seat 141.

A notch is formed around an outer wall surface of each screw seat 141, so the outer diameter of the screw seat 141 having the notch is smaller than the outer diameter of another end, and the end of the screw seat 141 having the notch is suitable for passing through a corresponding hole from the bottom surface BS of the motherboard 200 and being fixed to the motherboard 200 by welding, engaging, or adhering, etc.

More specifically, each screw 142 has a head part P1, a columnar part P2 and a threaded part P3. After each screw 142 passes through the top plate 120, the hollow column 131 and the motherboard 200 in order, the head part P1 is close to the top plate 120, the columnar part P2 extends from the head part P1 into the hollow column 131, the threaded part P3 is formed on an end of the columnar part P2 away from the head part P1, and the threaded part P3 enters the screw seat 141 to be screwed together with the internal thread of the screw seat 141. In addition, an outer diameter of the threaded part P3 is smaller than an outer diameter of the columnar part P2.

Referring to FIG. 1B, the baffle structure 100 further includes two auxiliary plates 150 respectively disposed on the ends of the two side plates 130 away from the top plate 120. Each auxiliary plate 150 extends vertically from the side plate 130 and is parallel to the motherboard 200. With the two auxiliary plates 150 brought into surface contact with the top surface TS of the motherboard 200, the baffle structure 100 is stably installed to the motherboard 200.

Referring to FIG. 1A, FIG. 2A to FIG. 2C and FIG. 3, a process of installing the baffle structure 100 and the motherboard 200 is briefly described below.

Referring to FIG. 3, the screw seats 141 in the corresponding number are installed to the bottom surface BS of the motherboard 200. Referring to FIG. 1A, the through holes TH of the front plate 110 are set to correspond to the connection ports 210 of the motherboard 200. Referring to FIG. 1B, FIG. 2A and FIG. 3, the accommodation space AS formed by the top plate 120 and the two side plates 130 is arranged to accommodate the connection ports 210, and the two auxiliary plates 150 are brought into surface contact with the top surface TS of the motherboard 200. Referring to FIG. 2B and FIG. 2C, each screw 142 is arranged to pass through the opening OP of the top plate 120 and enter the hollow column 131 and the motherboard 200. Referring to FIG. 3, at last, the columnar part P2 of each screw 142 is located inside the corresponding hollow column 131, and the threaded part P3 of each screw 142 is fixed to the corresponding screw seat 141.

Figure 4:
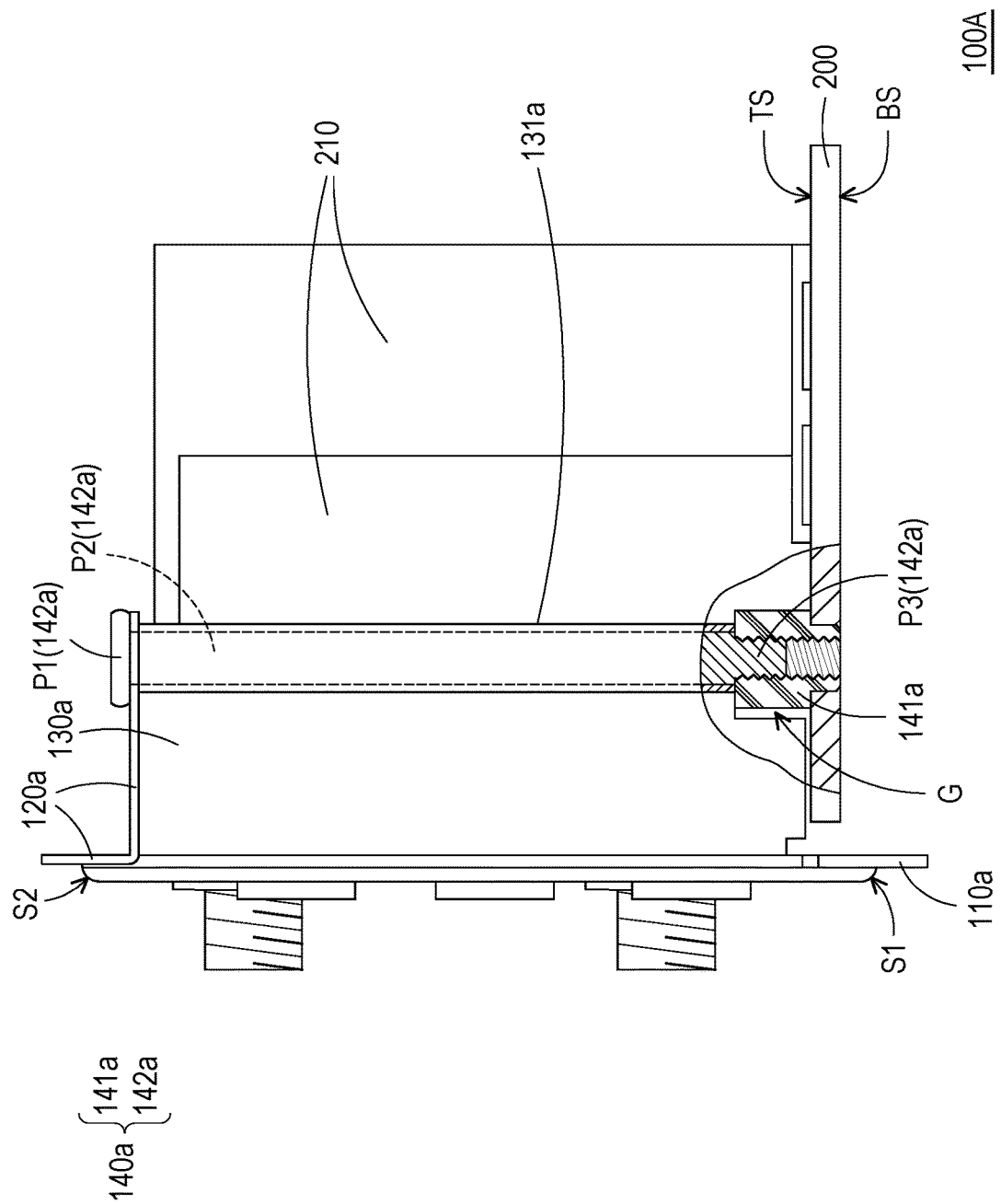
FIG. 4 is a schematic side view of a baffle structure combined with a motherboard according to another embodiment of the disclosure.

FIG. 4 is a schematic side view of a baffle structure combined with a motherboard according to another embodiment of the disclosure.

Referring to FIG. 4, a baffle structure 100A according to the embodiment is different from the baffle structure 100 illustrated in FIG. 3 in that a positioning component 140a has two screw seats 141a and two fixing parts 142a, and the two fixing parts 142a are two screws. Each screw seat 141a is disposed on the top surface TS of the motherboard 200 facing the side plate 130a, and each screw seat 141a is aligned with the hollow column 131a, each screw 142a passes through the top plate 120a and the hollow column 131a in order and is fixed to the screw seat 141a.

In addition, a notch is formed around the outer wall surface of each screw seat 141a, so the outer diameter of an end of the screw seat 141a having a notch is smaller than the outer diameter of another end, and the end of the screw seat 141a having a notch is suitable for passing through the corresponding hole from the top surface TS of the motherboard 200 and being fixed to the motherboard 200 through welding, engagement or adhesion, etc.

More specifically, each screw 142a has the head part P1, the columnar part P2 and the threaded part P3. After each screw 142a passes through the top plate 120a and the hollow column 131a in order, the head part P1 is close to the top plate 120a, the columnar part P2 extends from the head part P1 into the hollow column 131a, the threaded part P3 is formed on the end of the columnar part P2 away from the head part P1, and the threaded part P3 enters the screw seat 141a and is screwed together with the internal thread of the screw seat 141a.

More specifically, the screw seat 141 of the embodiment is connected to the top surface TS of the motherboard 200. Therefore, a slot G is formed between each side plate 130a and the motherboard 200 to accommodate the screw seat 141a. Since each screw 142a only needs to pass through the top plate 120a and the hollow column 131a, the overall length of the screw 142a is reduced.

Figure 5:
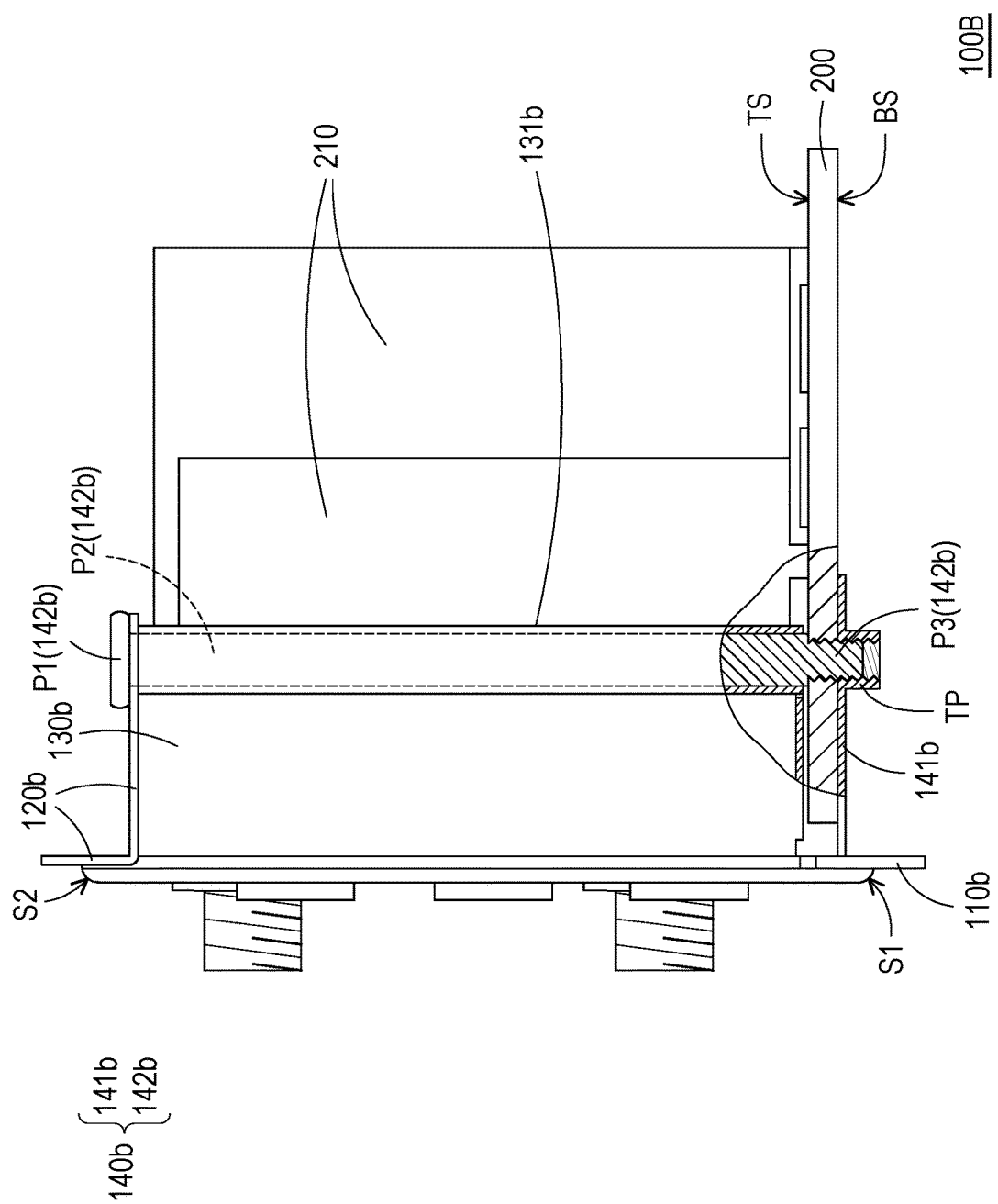
FIG. 5 is a cross-sectional side view of a baffle structure combined with a motherboard according to another embodiment of the disclosure.

FIG. 5 is a cross-sectional view of a baffle structure combined with the motherboard according to another embodiment of the disclosure.

Referring to FIG. 5, a baffle structure 100B according to the embodiment is different from the baffle structure 100 illustrated in FIG. 3 in that a positioning component 140b has a fastening plate 141b and two fixing parts 142b, and the two fixing parts 142b are two screws. The fastening plate 141b is disposed on the bottom space BS of the motherboard 200 away from the side plate 130b and connected to the front plate 110b. In addition, the fastening plate 141b has multiple tapping parts TP for alignment with the respective hollow columns 131b, each screw 142b passes through the top plate 120b, the hollow column 131b, and the motherboard 200 in order, and is fixed to the tapping part TP of the fastening plate 141b. The fastening plate 141b is integrally formed at the front plate 110b, and the fastening plate 141b extends toward the motherboard 200.

In addition, the tapping part TP of the fastening plate 141b is fit with the button surface BS of the motherboard 200, and the tapping part TP is in communication with the corresponding hole of the motherboard 200 and the hollow column 131b. Moreover, the tapping part TP may be fixed to the motherboard 200 through welding, engagement or adhesion, etc.

More specifically, each screw 142b has the head part P1, the columnar part P2 and the threaded part P3. After each screw 142b passes through the top plate 120b, the hollow column 131a and the motherboard 200 in order, the head part P1 is close to the top plate 120b; the columnar part P2 extends from the head part P1 into the hollow column 131b, the threaded part P3 is formed on an end of the columnar part P2 away from the head part P1, and the threaded part P3 enters the tapping part TP of the fastening plate 141b to tap and is eventually screwed with the corresponding tapping part TP.

More specifically, the tapping part TP is formed on the fastening plate 141b through stamping is provided with a guiding direction and a pore wall. After entering the tapping part TP, the threaded part P3 comes into contact with the pore wall to tap. As the length of the entered portion increases, the number of threads inside the pore wall also increases. Thus, the connection strength between the threaded part P3 and the tapping part TP is enhanced.

In view of the above, in the baffle structure according to the disclosure, the two side plates are directly fastened to the motherboard and accommodate multiple connection ports. During installation, the two side plates are aligned with a position where the motherboard is installed, and then the through holes of the front plate are aligned with the connection ports. Afterwards, the positioning component is disposed on the top plate and the two side plates to fix the end of the side plate to the motherboard.

More specifically, the baffle structure according to the disclosure is combined with the motherboard. Therefore, when compared with the conventional baffle structure that is a separate component from the motherboard, a process in which the user installs the baffle structure by him/herself is omitted, and the assembling efficiency is facilitated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A baffle structure, configured to be mounted to a motherboard, wherein the motherboard has a plurality of connection ports, and the baffle structure comprising:
a front plate, having a plurality of through holes, a first side and a second side opposite to each other, wherein the through holes are adapted to accommodate the connection ports, and the first side is adjacent to the motherboard;
two side plates, respectively disposed on two sides of the front plate, wherein a hollow column is provided at an end of each of the side plates away from the front plate;
a top plate, disposed on the second side, wherein two sides of the top plate are connected to the two side plates respectively, the top plate has two openings, and the two openings correspond to the two hollow columns respectively; and
a positioning component, comprising two fixing parts, wherein each of the two fixing parts passes through the top plate and a corresponding one of the hollow columns to be secured to the motherboard.

2. The baffle structure according to claim 1, wherein the positioning component further comprises two screw seats, the two fixing parts are the two screws, each of the screw seats is disposed on the motherboard, and each of the screw seats is aligned with each of the two hollow columns, and each of the screws passes through the top plate, the hollow column and the screw seat in order.

3. The baffle structure according to claim 2, wherein each of the screws has a head part, a columnar part and a threaded part, the head is close to the top plate, the columnar part extends from the head part into the hollow column, the threaded part is formed on an end of the columnar part away from the head part.

4. The baffle structure according to claim 3, wherein an outer diameter of the threaded part is smaller than an outer diameter of the columnar part.

5. The baffle structure according to claim 2, wherein each of the screw seats is disposed on a top surface of the motherboard facing one of the side plates or a bottom surface of the motherboard away from one of the side plates.

6. The baffle structure according to claim 1, wherein the positioning component further comprises a fastening plate, the two fixing parts are two screws, the fastening plate is disposed on a bottom surface of the motherboard away from the respective side plates, the fastening plate has a plurality of tapping parts for alignment with the two hollow columns, each of the screws passes through the top plate, the hollow column and the tapping part in order.

7. The baffle structure according to claim 6, wherein the fastening plate is integrally formed with the front plate and extends toward the motherboard.

8. The baffle structure according to claim 1, further comprising two auxiliary plates respectively disposed on the ends of the two side plates away from the top plate, wherein each auxiliary plate extends vertically from the side plate and is parallel to the motherboard.

9. The baffle structure according to claim 1, wherein the top plate and the two side plates form an accommodation space, and the accommodation space accommodates a portion of the connection ports.

10. The baffle structure according to claim 9, wherein the top plate and the two side plates form a U-shape.

* * * * *